United States Patent [19]

Boerema et al.

[11] Patent Number: 4,762,359
[45] Date of Patent: Aug. 9, 1988

[54] VISOR SYSTEM

[75] Inventors: Edward T. Boerema, Zeeland; Michael J. Suman; Dennis J. Fleming, both of Holland, all of Mich.

[73] Assignee: Prince Corporation, Holland, Mich.

[21] Appl. No.: 21,978

[22] Filed: Mar. 5, 1987

Related U.S. Application Data

[63] Continuation of Ser. No. 667,765, Nov. 2, 1984, Pat. No. 4,690,450.

[51] Int. Cl.⁴ ............................................... B62J 3/02
[52] U.S. Cl. ................................. 296/97 K; 296/97 R
[58] Field of Search ............ 296/97 R, 97 B, 97 D, 296/97 J, 97 K, 95 R, 97 C, 97 F

[56] References Cited

U.S. PATENT DOCUMENTS

| 1,932,475 | 10/1933 | Peteler | 296/97 |
| 1,941,032 | 12/1933 | Knowles | 296/97 |
| 2,120,892 | 6/1938 | Francis | 296/97 |
| 2,261,881 | 11/1941 | Horstmann | 296/97 |
| 2,414,340 | 1/1947 | Spraragen | 296/97 K |
| 2,492,074 | 12/1949 | Thompson | 296/97 |
| 2,517,872 | 8/1950 | Hamel | 296/97 |
| 2,634,161 | 4/1953 | Beets | 296/97 K |
| 2,681,824 | 6/1954 | Knoblock | 296/97 |
| 2,695,193 | 11/1954 | Hamel | 296/97 K |
| 2,823,950 | 2/1958 | Harris | 296/97 |
| 2,829,920 | 4/1958 | Cohen | 296/97 |
| 2,831,725 | 4/1958 | Chester | 296/97 |
| 2,869,922 | 1/1959 | Chester | 296/97 |
| 2,921,813 | 1/1960 | Lowry | 296/97 C |
| 2,932,539 | 4/1960 | Galbraith | 296/97 |
| 2,958,559 | 11/1960 | Jensen | 296/97 C |
| 2,965,415 | 12/1960 | Dryden | 296/97 K |
| 2,978,274 | 4/1961 | Ordman | 296/97 |
| 2,999,718 | 9/1961 | Handler | 296/97 K |
| 3,032,371 | 5/1962 | Berridge et al. | 296/97 K |
| 3,191,986 | 6/1965 | Simon | 296/97 K |
| 3,328,071 | 6/1967 | Johnson | 296/97 |
| 3,403,937 | 10/1968 | Quaine | 296/97 |
| 3,499,679 | 3/1970 | Olander | 296/97 |
| 3,556,585 | 1/1971 | Binder | 296/97 K |
| 3,865,428 | 2/1975 | Chester | 296/97 |
| 4,053,180 | 10/1977 | White | 296/97 K |
| 4,176,875 | 12/1979 | Dow | 296/97 K |
| 4,272,118 | 6/1981 | Viertel et al. | 296/97 H |
| 4,451,076 | 5/1984 | Viertel et al. | 296/97 |
| 4,492,404 | 1/1985 | Marcus et al. | 296/97 J |
| 4,679,843 | 7/1987 | Spykerman | 296/97 R X |

FOREIGN PATENT DOCUMENTS

| 36659 | 10/1926 | Denmark | 296/97 |
| 1911384 | 3/1964 | Fed. Rep. of Germany . | |
| 3021957 | 1/1982 | Fed. Rep. of Germany | 296/97 C |
| 3235997 | 3/1984 | Fed. Rep. of Germany . | |
| 1396360 | 3/1965 | France . | |
| 2497157 | 7/1982 | France . | |
| 1109788 | 2/1986 | France | 296/97 K |
| 639882 | 5/1962 | Italy | 296/97 J |
| 665797 | 7/1964 | Italy | 296/97 R |
| 0063517 | 4/1983 | Japan | 296/97 H |

Primary Examiner—Robert B. Reeves
Assistant Examiner—Russell D. Stormer
Attorney, Agent, or Firm—Price, Heneveld, Cooper, DeWitt & Litton

[57] ABSTRACT

A visor system includes a pair of spaced mounting brackets to support a first visor movable between a raised stored position and a lowered use position and one which can be moved to a side window for providing protection against incident light from the side. The brackets also support an auxiliary visor which is pivoted on an axis located above the vehicle's windshield between a raised, stored position and a lowered, use position and is movable laterally along the axis.

9 Claims, 2 Drawing Sheets

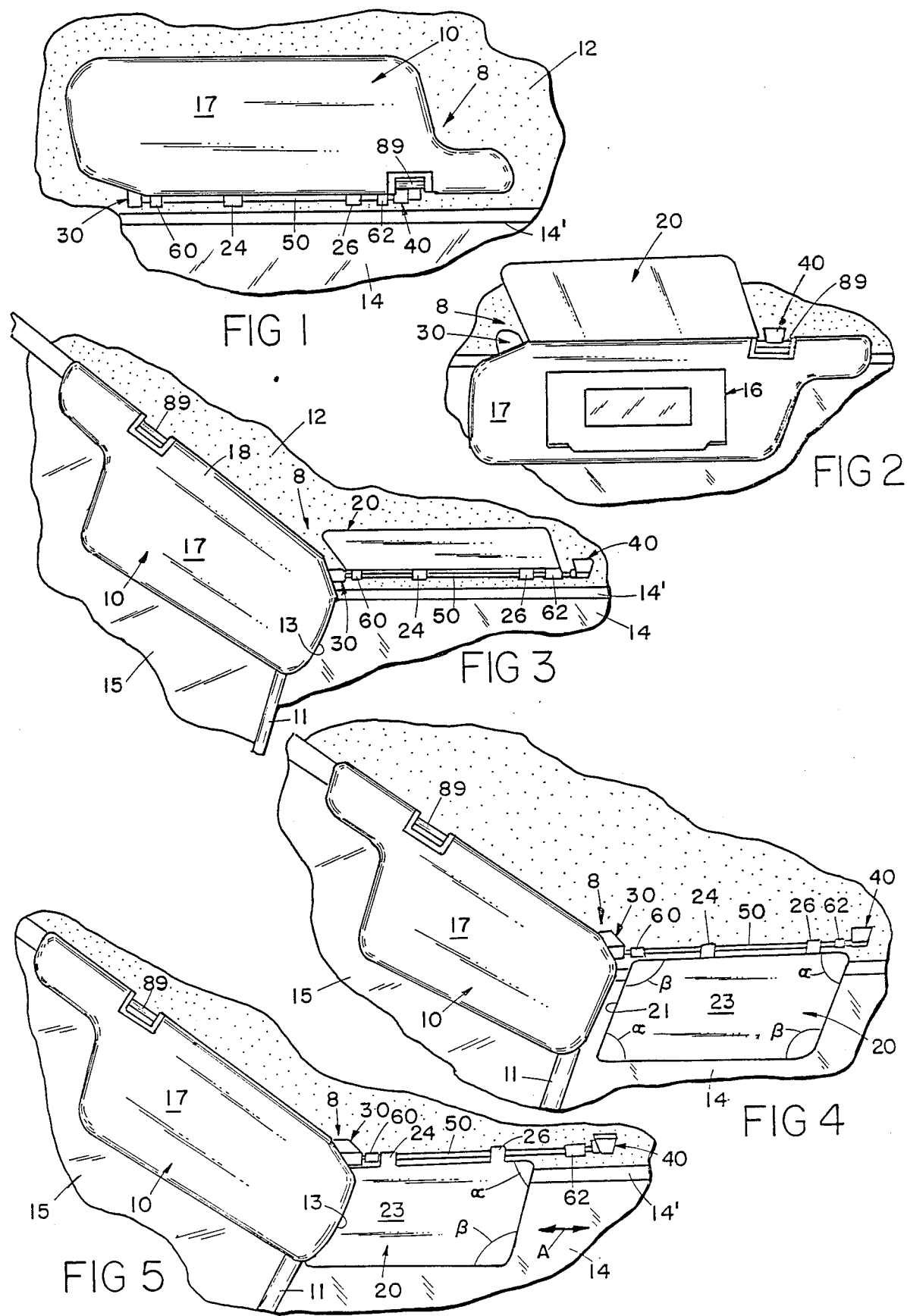

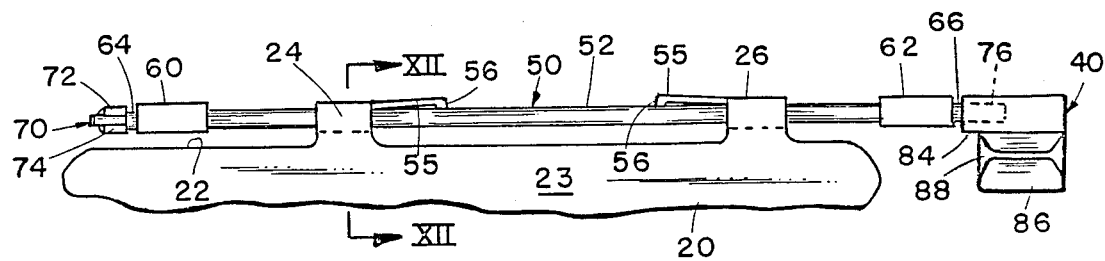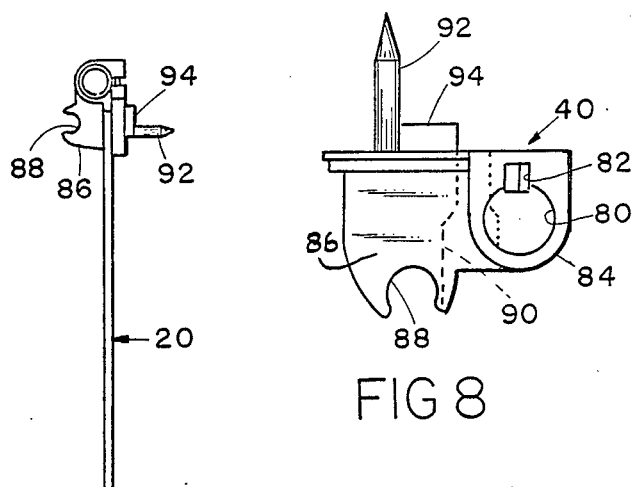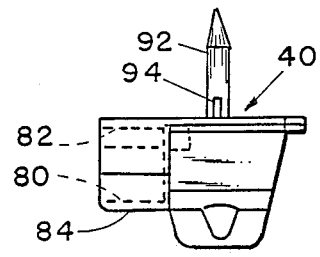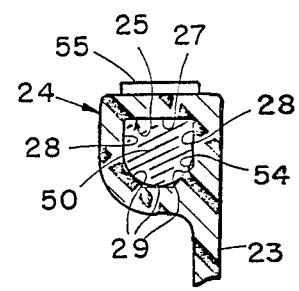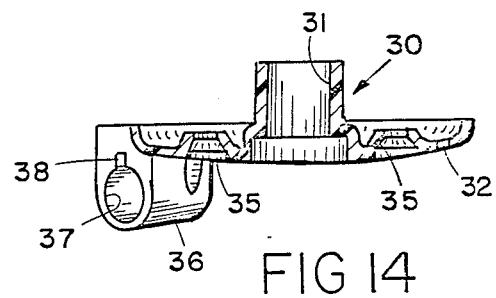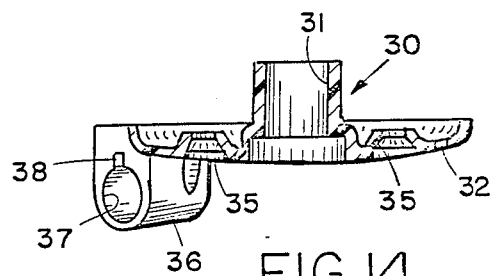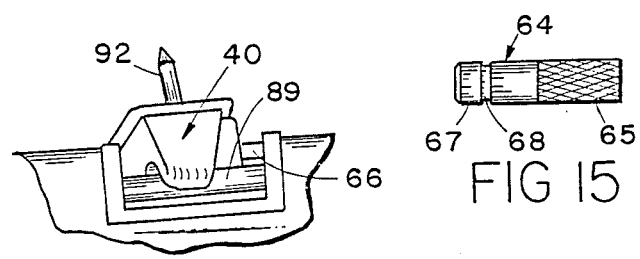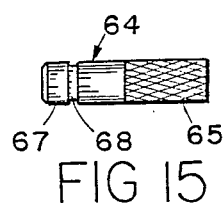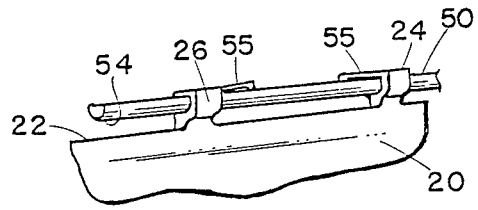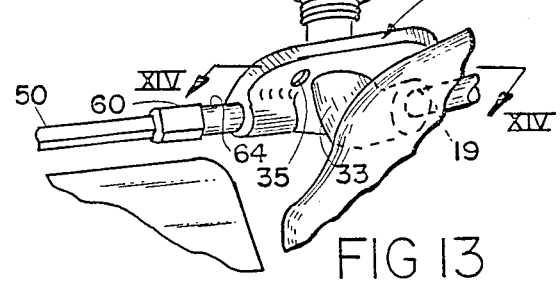

VISOR SYSTEM

This is a continuation of application Ser. No. 667,765, filed Nov. 2, 1984, now U.S. Pat. No. 4,690,450.

BACKGROUND OF THE INVENTION

The present invention pertains to vehicle visors and particularly to a system with multiple visors.

Typically, automotive visors are installed such that they can pivot from a lowered use position against the windshield or over a side window if the sun is entering the vehicle from the side. When driving along a curved highway, it can be necessary to frequently move the visor from the front to the side while driving. This can not only be burdensome but when ducking under the visor, as it is moved, the driver's attention is distracted, creating a potentially hazardous driving situation.

In order to provide both side and front window shade, visor systems have been proposed which employ a primary conventional visor and a secondary or auxiliary visor. U.S. Pat. Nos. 2,261,881; 2,492,074; 2,517,872; 2,823,950; and 3,499,679 are representative of such structure. In these structures, an auxiliary visor is provided and is coupled directly to the primary visor through a pivot connection such that it can be moved to a variety of locations providing sun blocking along more than one axis of incident sunlight. Other prior art visor systems provide separate side window visors which are permanently mounted above the side windows. U.S. Pat. No. 4,468,062, assigned to the present assignee is representative of a side window visor installation.

SUMMARY OF THE PRESENT INVENTION

The system of the preent invention provides an improved auxiliary visor system in which a pair of spaced mounting brackets support a first visor movable between a raised, stored position and a lowered, use position and one which can be moved to a side window for providing protection against incident light from the side. The brackets also support an auxiliary visor which is pivoted on an axis located above the vehicle's windshield between a raised, stored position and a lowered, use position and is movable laterally along the axis. With such a system, the auxiliary visor can become the primary windshield visor, and the primary visor become the side window visor during use. Alternatively, when only a front visor is necessary, the primary visor can be used independently of the auxiliary visor panel. The system is relatively compact and employs a pair of parallel pivot axes which allow storage of the visor system against the vehicle headliner when not in use in a compact and attractive visor installation which has the appearance of a normal visor installation.

These and other features, objects and advantages of the present invention will become apparent upon reading the following description thereof together with reference to the accompanying drawings in which:

BRIEF DESCRIPTION OF THE DRAWINGS

FIG. 1 is a front elevational view of a visor installation embodying the present invention shown with both visor panels in a raised, stored position;

FIG. 2 is a front elevational view of the structure shown in FIG. 1 with the primary visor shown in a lowered forward windshield use position;

FIG. 3 is a front elevational view of the structure shown in FIG. 1 shown with the primary visor lowered and pivoted to cover the side window for use in blocking light incident from the side of the vehicle;

FIG. 4 is a front elevational view of the structure shown in FIG. 1 with the primary visor panel shown in the position shown in FIG. 3 and the auxiliary visor panel shown in a first lowered use position;

FIG. 5 is a front elevational view of the structure shown in FIG. 4 with the auxiliary visor panel moved laterally to a second use position;

FIG. 6 is an enlarged, fragmentary, front elevational view of a portion of the auxiliary visor mounting structure;

FIG. 7 is a right side elevational view of the structure shown in FIG. 6;

FIG. 8 is an enlarged side elevational view of the mounting bracket shown in FIG. 6;

FIG. 9 is a right side elevational view of the structure shown in FIG. 8;

FIG. 10 is a fragmentary, perspective view showing the interrelationship of the mounting bracket shown in FIGS. 8 and 9 and the primary visor;

FIG. 11 is a fragmentary, perspective view of the auxiliary visor and rod;

FIG. 12 is an enlarged, cross-sectional, fragmentary view of the structure shown in FIG. 6 takn along section line XII—XII;

FIG. 13 is a fragmentary, perspective view of the other mounting bracket taken in a direction opposite that shown in FIG. 4;

FIG. 14 is a vertical, cross-sectional view of the bracket shown in FIG. 13 taken along an axis XIV—XIV; and FIG. 15 is an enlarged, front elevational view of one of the coupling members shown in FIG. 6.

DETAILED DESCRIPTION OF THE PREFERRED EMBODIMENT

Referring initially to FIGS. 1–5, there is shown the preferred embodiment of the invention which is shown installed in a vehicle on the driver's side. The visor system 8 of the present invention comprises a first, or primary, visor 10 and a second, or auxiliary, visor panel 20. Both visors 10 and 20 are coupled between a first mounting bracket 30 and a second mounting bracket 40 which are mounted in spaced relationship to the roof 12 of a vehicle above its windshield 14. In the embodiment shown, the driver's side visor system is mounted to the right of the A-pillar 11 of the vehicle which extends between the windshield 14 and the left side window 15.

As seen in the progression of visor positions, shown in FIGS. 1–5, the first visor 10 operates in the nature of a conventional visor, movable between a raised, stored position, shown in FIG. 1, to a lowered windshield position, as illustrated in FIG. 2. The visor can then be moved to a side window blocking position, shown in FIGS. 3–5. The second, or auxiliary, visor panel 20 can be lowered to a variety of use positions, two of which are illustrated in FIGS. 4 and 5. When both visors 10 and 20 are in raised, stored position, as illustrated in FIG. 1, the auxiliary visor 20 is concealed between visor 10 and roof, or headliner, 12 of the vehicle, and therefore, the system appears substantially the same as a conventional visor installation. Having briefly described the operation of the visor system, a detailed description of the unique visor system is now presented.

The first or primary visor 10 may include, as illustrated in FIG. 2, a covered illuminated mirror package 16 of the type described in U.S. Pat. No. 4,227,241, the disclosure of which is incorporated herein by reference. Similarly, the visor could include a slide-out illuminated vanity mirror package as described in U.S. patent application Ser. No. 538,569, entitled VEHICLE VISOR LIGHTING APPARATUS, filed on Oct. 3, 1983, and assigned to the present assignee. Alternatively, the visor can be a standard blank visor. Visor 10 includes a polymeric core covered by a suitable upholstery material 17 to conform the visor to the interior decor of the vehicle in which it is installed. A visor pivot rod 19 (FIG. 13) extends within the visor core adjacent the top edge 18 thereof to permit the visor to pivot on the visor rod 19 for movement between a raised, stored position and a lowered, use position, as illustrated in FIGS. 1 and 2, respectively. The visor pivot rod and its connection within the body of the visor 10 is disclosed in greater detail in U.S. patent application Ser. No. 392,534, filed June 28, 1982 and entitled VISOR CONTROL, the disclosure of which is incorporated herein by reference. The visor pivot rod is itself conventional and forms no part of the present invention other than providing a pivotal interface between the visor body 10 and the pivot rod extending from an end thereof which is pivotally coupled to mounting bracket 30.

Bracket 30 is best seen in FIGS. 13 and 14 and includes a cast housing 32 with a central cylindrical opening 31 for receiving a conventional pivot elbow 33 with the visor pivot rod 19 press-fit through an aperture in one end thereof and an opposite end extending through aperture 31 in housing 32. The pivotal mounting of elbow 33 within aperture 31 is provided by a compression spring and locking washer arrangement 34 which is conventional. Visor 10 can thus rotate about the longitudinal axis of aperture 31 to move between the front windshield and the side window, as illustrated in FIGS. 2 and 3. Housing 32 includes a pair of spaced, integrally formed apertures 35 positioned on opposite sides of aperture 31 for receiving fastening screws for securing the housing and visor assembly coupled thereto to the sheet metal structure of the roof of the vehicle in a conventional manner. Unique to housing 32, however, is an integrally molded socket 36 extending in angled relationship and offset from cylindrical aperture 31 for supporting an end of auxiliary visor rod 50 via a coupling 64, as described below. Member 36 includes an aperture 37 formed therein and extending in a direction generally orthogonal to and offset from the axis of aperture 31 and including a rectangular keyway 38 for lockably receiving a torque fitting 70, as described in greater detail below. The axes of aperture 37 are selected to position the auxiliary visor rod 50 to which visor panel 20 is coupled in generally parallel relationship to visor rod 19 and the windshield molding 14' located at the interface of the front windshield 14 and roof 12 of the vehicle, as best seen in FIGS. 3 and 5. For different vehicles, naturally, the socket 36 will be necessarily canted at different angles to accommodate this desired location.

Thus, the bracket assembly 30 including the housing 32 provides a fixed anchored position for one end of the conventional visor pivot rod 19 through elbow 33 and one end of the auxiliary visor rod 50. Elbow 33 preferably is hollow to permit a pair of electrical conductors 39 to extend therethrough and within the hollow visor rod 19 for providing electrical operating power to the illuminated vanity mirror assembly 16, as described in the above identified patent. Bracket 30 allows the visor 10 to operate in the same manner as a conventional visor, namely, move between a raised, stored position, shown in FIG. 1, to a lowered, use position (FIG. 2), and subsequently, pivoted about the axis of aperture 31 of housing 32 to the side window position, as shown in FIGS. 3–5. Thus, housing 32 provides the normal conventional visor mounting function in addition to supporting one end of the auxiliary visor rod 50.

Visor 20, in the preferred embodiment of the invention, is a blade-type visor in the shape of a parallelogram with opposite acute angles $\alpha$ of about 75 degrees and opposite obtuse angles $\beta$ of about 105 degrees. The visor has a thickness, in the preferred embodiment, of approximately 0.082 inch and is integrally molded of an opaque polymeric material such as polycarbonate. The visor has a mean width of 11 inches and a mean height of 5¾ inches, and this construction, as well as its mounting, permits the concealed storage of the visor behind the primary visor 10, as shown in FIG. 1. The parallelogram shape of the visor permits the left edge 21 of the visor to extend in parallel relationship to the A-pillar 11 and therefore block, as seen in FIG. 5, any gap which could be located between the edge 13 of visor 10 and edge 21 of visor 20. This effectively prevents incident light from striking the driver when entering from the left front of the windshield or side window.

Visor 20 integrally includes along an edge 22 thereof, as best seen in FIGS. 6, 11 and 12, a pair of horizontally spaced mounting bosses 24 and 26, integrally formed and extending forwardly of the rear surface 23. Each of the bosses 24 and 26 includes a configured aperture extending therethrough in a direction parallel to edge 22 of the visor with the aperture being of generally D-shaped construction for slidably receiving the D-shaped, cross-sectional rod 50. The aperture 25 formed in each of the mounting bosses 24 and 26 includes an upper flat surface 27, sidewalls 28 and three segmented lower edges 29 which generally conform to the radius of curvature of the curved lower surface 54 of rod 50. By shaping aperture 25 in this configuration, visor 20 can slide easily along the axis of visor rod 50 in a direction indicated by arrow A in FIG. 5. To permit such sliding motion, therefore, the aperture 25 is slightly larger than the rod 50. The cross-sectional configuration of rod 50 and aperture 25 is selected to prevent rotation of the visor 20 with respect to rod 50 in the preferred embodiment inasmuch as rod 50 is pivotally mounted, as will be decribed below, between brackets 30 and 40.

To allow the free sliding motion of the visor panel 20 on rod 50, by providing an enlarged aperture 25, a pair of tensioning arms 55 integrally extend from the inner edges of bosses 24 and 26 at the top thereof and are desirable. Arms 55 include tips 56 which engage the top surface 52 of the D-shaped rod 50 and slide therealong to prevent unnecessary instability of the visor panel 20 on rod 50 and yet allow the free sliding of the visor panel along the pivot rod. It has been discovered that in order to provide the relatively easy sliding motion of panel 20 with respect to visor rod 50, it is necessary to pivot rod 50 and key the visor panel to the rod against rotation. If the rod and aperture 25 were fixed and circular, it would be necessary to provide enough frictional interengagement between the visor panel and rod to allow the panel to remain in a raised stored position, as illustrated in FIGS. 2 and 3. Such friction would prevent the visor panel from sliding easily along the rod. Thus, a rotating rod 50 keyed to the visor is desired to permit the free sliding of visor panel 20 with respect thereto.

The visor rod 50 is coupled between brackets 30 and 40 through a pair of sleeve couplings 60 and 62, as best seen in FIG. 6. The inner facing ends of sleeve couplings 60 and 62 have D-shaped apertures for receiving rod 50 and prevent relative rotation between the rod and the couplings. The opposite end of each of the molded polymeric couplings 60 and 62 is molded over knurled ends 65 of coupling rods 64 and 55 with rod 64 being shown in detail in FIG. 15. Rod 64 has a first knurled end 65 over which sleeve 60 is molded to prevent relative rotation therebetween and a second end 67 with an annular groove 68 over which a molded-on torque fitting 70 (FIG. 6) is molded. Fitting 70 includes, as best seen in FIG. 6, a generally cylindrical body 72 conforming in diameter to cylindrical opening 37 of socket 36 associated with bracket 30 and a rectangular key 74 which mates and lockably engages aperture 38 in socket 36. The opposite end of rod 50 similarly includes a coupling 66 of substantially identical construction to coupling 64 and a similarly shaped molded-on torque fitting 76, shown schematically in FIG. 6, which is lockably fitted in keyed aperture 80 (FIG. 8) of mounting bracket 40.

Molded-on torque fittings 74 and 76 are molded to the annular grooved ends of coupling members 64 and 66 and are made of an acetal and particularly an acetal homopolymer such as CELCON®. Other polymeric materials, however, having a shrinkage of from 0.020 to 0.025 inch per linear inch to compressibly engage the ends of cylindrical rods 64 and 66 and which will not set up upon cooling to provide a breakaway torque of about ½ to 6 foot pounds at this interface can be employed. U.S. Pat. No. 4,352,518 discloses molded-on torque fittings of the general type which can be employed in the preferred embodiment of the present invention. Thus, the rotation of rod 50 occurs at the interface of fittings 70 and 76 with the ends of coupling rods 64 and 66.

Torque fitting 76 fits within a cylindrical aperture 80 of mounting bracket 40. Aperture 80 includes a keyway 82 for receiving the key on torque fitting 76 which is substantially the same as that shown on fitting 70 in FIG. 6. The keyed aperture 80 is integrally formed in a mounting boss 84 integral with polymeric body 86 of member 40 which also includes a semicircular longitudinally extending socket 88 for releasably holding a rod 89 extending along the top edge 18 of visor 10 for holding the visor in the position shown in FIGS. 1 and 2, as best seen in FIG. 10. The body of bracket 40 includes a centrally located aperture 90 for receiving a recessed attachment screw which extends through the bracket and into the sheet metal roof of a vehicle for attachment of the bracket in the position shown in FIGS. 1–5. The bracket includes an integrally molded alignment pin 92 a well as a rectangular key 94 extending from the upper surface of bracket 40 and extending from the sidewall of pin 92. The pin and key 94 assure the proper mounting position of the bracket with respect to a similarly shaped aperture and slot formed in the vehicle roof for original equipment vehicles.

Brackets 30 and 40 are spaced to align the mounting rod 89 of visor 10, as illustrated in the Figures, to provide the demountable coupling of visor 10 to bracket 40, and the permanent positioning of rod 50 between brackets 30 and 40. As can be seen in FIG. 1, in particular, the visor rod 50 is positioned parallel to the edge 18 or primary visor 10 and its pivot rod 19 and extends generally parallel to molding 14' to provide a compact, neat appearing and functional auxiliary visor system. The 10¼ length of rod 50 together with the 5¾ inch spacing between bosses 24 and 26 allow at least a 4 inch sliding lateral adjustment of visor 20.

It will become apparent to those skilled in the art that various modifications to the preferred embodiment of the invention as disclosed herein can be made. Thus, for example, the assembly can be employed on the passenger side of the vehicle by providing mirror-imaged brackets 30 and 40 for such an installation. The particular materials employed may be varied as well. These and other modifications to the preferred embodiment will, however, fall within the spirit and scope of the invention as defined by the appended claims.

The embodiments of the invention in which an exclusive property or privilege is claimed are defined as follows:

1. A visor system for selectively providing simultaneous sun blocking protection for the windshield and a side window of a vehicle, in which an angled pillar extends between the windshield and the side window comprising:

a pair of brackets adapted to be mounted in spaced relationship above a vehicle window;

a first visor pivotally coupled to one of said brackets for independent movement of said visor in a generally horizontal direction to selectively and independently provide sun blocking for either a side window or the windshield;

a second visor having a horizontal length substantially less than that of said first visor, said second visor having a first edge which is proximate the pillar between the vehicle windshield and side window when mounted to the vehicle; and means for mounting said second visor for sliding movement between said brackets, said mounting means and said second visor coupled to be movable together about an axis parallel to the longitudinal axis of said second visor such that when said second visor is moved between a raised, stored position adjacent the vehicle roof and a lowered use position adjacent the vehicle windshield said mounting means rotates with said second visor; and wherein said brackets and said mounting means permit said first visor to be moved from a raised, stored position to a lowered use position and subsequently moved to a side window use position with said second visor remaining in a stored position against the vehicle headliner to provide said independent movement of said first visor.

2. The visor system as defined in claim 1 wherein said mounting means includes rod means and means supporting opposite ends of said rod means between said brackets.

3. The visor system as defined in claim 2 wherein said supporting means includes means for rotatably coupling said rod means betwen said brackets.

4. The visor system as defined in claim 3 wherein said rod means comprises a rod which is D-shaped in cross section and said mounting means includes bosses each including a generally D-shaped aperture for slidably receiving said rod.

5. The visor system as defined in claim 4 wherein said second visor is a blade molded of polymeric material with said mounting bosses integrally molded thereto.

6. The visor system as defined in claim 5 wherein each of said bosses includes a resilient finger extending adjacent to and engaging said rod for stabilizing the coupling of said blade to said rod.

7. The visor system as defined in claim 1 wherein said second visor comprises a planar member with edges proximate said mounting means and the pillar forming an obtuse angle, and the junction of the edge proximate the pillar and opposite the mounting member defining an acute angle.

8. The visor system as defined in claim 7 wherein said second visor is a relatively thin molded polymeric blade shaped as a parallelogram.

9. The visor system as defined in claim 8 wherein said first visor is releasably held by the other of said brackets.

* * * * *